(12) United States Patent
Cao

(10) Patent No.: US 10,820,693 B2
(45) Date of Patent: Nov. 3, 2020

(54) AIR-PERMEABLE STORAGE CABINET CONVENIENT TO DISASSEMBLE AND ASSEMBLE

(71) Applicant: Guohua Cao, Guangdong (CN)

(72) Inventor: Guohua Cao, Guangdong (CN)

( * ) Notice: Subject to any disclaimer, the term of this patent is extended or adjusted under 35 U.S.C. 154(b) by 78 days.

(21) Appl. No.: 16/212,641

(22) Filed: Dec. 6, 2018

(65) Prior Publication Data

US 2020/0154883 A1 May 21, 2020

(30) Foreign Application Priority Data

Nov. 21, 2018 (CN) ............... 2018 2 1917375 U

(51) Int. Cl.
| | | |
|---|---|---|
| *A47B 47/03* | (2006.01) | |
| *F16B 12/36* | (2006.01) | |
| *F16B 12/52* | (2006.01) | |
| *F16B 12/10* | (2006.01) | |

(52) U.S. Cl.
CPC ............ *A47B 47/03* (2013.01); *F16B 12/36* (2013.01); *F16B 12/52* (2013.01); *A47B 2230/0037* (2013.01); *F16B 2012/103* (2013.01)

(58) Field of Classification Search
CPC ............ A47B 47/03; A47B 2030/0037; A47B 47/047; A47B 47/0025; A47B 47/0066; A47B 47/0075; A47B 47/0091; A47B 47/0042; A47B 55/00
USPC ........ 312/265.1–265.6, 257.1, 213; 220/485, 220/486, 489, 493, 494, 4.28, 4.33; 403/292, 294, 298
See application file for complete search history.

(56) References Cited

U.S. PATENT DOCUMENTS

| | | | | |
|---|---|---|---|---|
| 810,415 | A * | 1/1908 | Jefferies | |
| 900,162 | A * | 10/1908 | Goodwin | |
| 887,168 | A * | 12/1908 | Will | |
| 1,113,432 | A * | 10/1914 | Hansen ............... | A47B 47/03 312/263 |
| 1,152,644 | A * | 9/1915 | King ................. | A47B 61/00 312/213 |
| 1,258,773 | A * | 3/1918 | Hoffmann .......... | A47B 61/00 312/213 |
| 1,363,130 | A * | 12/1920 | Kuder ................ | F26B 9/06 312/213 |
| 1,916,852 | A * | 7/1933 | Sutton ............... | F25D 25/022 211/126.15 |

(Continued)

OTHER PUBLICATIONS

KR2018073331 Leem SK; abstract and figure (Year: 2018).*
KR2085150 Klm G H; abstract and figure (Year: 2020).*

*Primary Examiner* — Janet M Wilkens

(57) ABSTRACT

An air-permeable storage cabinet, wherein the left and right sides of the bottom of the upper frame are provided with a first connector respectively, a first connecting hole is formed in the tops or inner side faces of the left frame and the right frame respectively, the bottom face of the rear of the upper frame is provided with a second connector, a second connecting hole is formed in the top of the rear frame, the left and right sides of the top of the lower frame are provided with a third connector respectively, a third connecting hole is formed in the bottoms or inner side faces of the left frame and the right frame respectively, the bottom face of the rear of the lower frame is provided with a fourth connector, and a fourth connecting hole is formed in the bottom of the rear frame.

9 Claims, 11 Drawing Sheets

(56) References Cited

U.S. PATENT DOCUMENTS

| | | | | | |
|---|---|---|---|---|---|
| 2,015,292 | A | * | 9/1935 | Schweller | F25D 23/00 248/188 |
| 2,667,398 | A | * | 1/1954 | Claflin | A47B 71/00 312/265 |
| 2,720,996 | A | * | 10/1955 | Anderson | B65D 7/14 220/1.5 |
| 2,818,192 | A | * | 12/1957 | Weiner | B65D 7/12 220/4.28 |
| 3,128,002 | A | * | 4/1964 | Buchanan | B65D 7/24 220/4.28 |
| 3,218,097 | A | * | 11/1965 | Bowers | F16B 7/025 403/295 |
| 3,407,941 | A | * | 10/1968 | Schmidt | B65F 1/1426 211/84 |
| 3,434,769 | A | * | 3/1969 | Salet | B65D 9/14 312/258 |
| D283,182 | S | * | 4/1986 | Marshall | D30/108 |
| 4,795,057 | A | * | 1/1989 | Jungels | B65D 19/10 206/386 |
| 5,308,157 | A | * | 5/1994 | Dyer | A47B 43/00 312/258 |
| 6,419,103 | B1 | * | 7/2002 | Wang | B65D 9/10 220/4.33 |
| 7,228,985 | B2 | * | 6/2007 | Yeh | B62D 25/084 220/485 |
| 10,506,876 | B1 | * | 12/2019 | Chen | A47B 47/03 |

* cited by examiner

AIR-PERMEABLE STORAGE CABINET CONVENIENT TO DISASSEMBLE AND ASSEMBLE

BACKGROUND OF THE INVENTION

The disclosure relates to the technical field of storage cabinets, and more specifically, relates to an air-permeable storage cabinet convenient to disassemble and assemble.

Storage cabinets need to be used for storage during the storage and trimming of daily living equipment in the life or work, however, existing storage cabinets are all timber storage cabinets, a great deal of timber needs to be consumed and is not environmentally-friendly, and the weight is extremely heavy, moreover, the existing storage cabinets cannot be disassembled, the occupied space is relatively large when the existing storage cabinets are transported or do not need to be used, the transportation cost is increased, and the existing storage cabinets are easily deformed or damaged during transportation.

BRIEF SUMMARY OF THE INVENTION

The disclosure aims to overcome the defects in the prior art, and provides an air-permeable storage cabinet convenient to disassemble and assemble, which can save timber and protect the environment and realizes detachable connection of the framework, the framework can be disassembled for transportation or storage when the air-permeable storage cabinet is transported or does not need to be used, the occupied space during transportation or storage is effectively reduced, the transportation cost is greatly reduced, the framework is convenient to assemble, and the operation is simple.

In order to achieve the purpose, the disclosure provides an air-permeable storage cabinet convenient to disassemble and assemble comprising a framework, the framework comprises an upper frame, a lower frame, a left frame, a right frame and a rear frame, the left frame is arranged on one side of the rear frame, the right frame is arranged on the other side of the rear frame, the upper frame is arranged above or inside the left frame and the right frame, the lower frame is arranged below or inside the left frame and the right frame, the left side and right side or the left side face and right side face of the bottom of the upper frame are provided with at least one first connector respectively, at least one first connecting hole corresponding to the first connector is formed in the tops or inner side faces of the left frame and the right frame respectively, the first connectors are fixedly in inserted connection with the corresponding first connecting holes respectively, the bottom face of the rear of the upper frame is provided with at least one second connector, at least one second connecting hole corresponding to the second connector is formed in the top of the rear frame, the second connector is fixedly in inserted connection with the second connecting hole, the left side and right side or the left side face and right side face of the top of the lower frame are provided with at least one third connector respectively, at least one third connecting hole corresponding to the third connector is formed in the bottoms or inner side faces of the left frame and the right frame respectively, the third connector is fixedly in inserted connection with the third connecting hole, the rear of the top of the lower frame is provided with at least one fourth connector, at least one fourth connecting hole corresponding to the fourth connector is formed in the bottom of the rear frame, the fourth connector is fixedly in inserted connection with the fourth connecting hole, the inner side face of the rear of the right frame is provided with at least one fifth connector, at least one fifth connecting hole corresponding to the fifth connector is formed in the right side face of the rear frame, the inner side face of the rear of the left frame is provided with at least one sixth connector, at least one sixth connecting hole corresponding to the sixth connector is formed in the left side face of the rear frame, the fifth connector is fixedly in inserted connection with the fifth connecting hole, and the sixth connector is fixedly in inserted connection with the sixth connecting hole.

Preferably, connecting pieces are arranged inside the first connecting hole, the second connecting hole, the third connecting hole, the fourth connecting hole, the fifth connecting hole and the sixth connecting hole respectively, the inner wall of each connecting piece is inwards convexly provided with a convex ring, the first connector, the second connector, the third connector, the fourth connector, the fifth connector and the sixth connector are in inserted connection with the corresponding connecting pieces respectively, and are in clamping connection with the convex rings on the connecting pieces.

Preferably, the air-permeable storage cabinet further comprises a front frame, the front frame is articulated with the left frame or the right frame, and each of the upper frame, the lower frame, the left frame, the right frame, the front frame and the rear frame comprises a frame body and a rhombus net.

Preferably, the periphery edge of each rhombus net is fixedly connected with the periphery of the corresponding frame body through welding respectively.

Preferably, the periphery edge of each rhombus net is in inserted connection with the interior periphery of the corresponding frame body, a slot for being in inserted connection with each rhombus net is formed in the interior periphery of the corresponding frame body, and the periphery edge of each rhombus net is in inserted connection with the corresponding slot in the interior periphery of the corresponding frame body and is fixedly connected with the frame body through extrusion.

Preferably, a bending part, which bends towards the inner side or outer side of each frame body, integrally molded with each frame body, is arranged at the position of the corresponding slot, and each bending part is in contact with the periphery edge of the corresponding rhombus net.

Preferably, a bending part which bends towards the inner side or outer side of each frame body and is in contact with the inner wall or outer wall of each frame body, integrally molded with each frame body, is arranged at the position of the corresponding slot, and each bending part is in contact with the periphery edge of the corresponding rhombus net.

Preferably, each bending part is provided with a plurality of convex points in an equally-spaced manner.

Preferably, at least one placing plate is arranged inside the framework, the placing plate is arranged between the left frame and the right frame, at least one first clamping bulge is arranged in the front of the interiors of the left frame and the right frame, at least one second clamping bulge which is matched with the first clamping bulge and is arranged on the same horizontal line is arranged on the rear side faces of the interiors of the left frame and the right frame, first clamping grooves corresponding to the first clamping bulges are formed in the left end and right end of the bottom of the front part of the placing plate respectively, second clamping grooves corresponding to the second clamping bulges are formed in the left end and right end of the bottom of the rear side face of the placing plate respectively, the first clamping bulges are cooperatively in clamping connection with the first clamping grooves, and the second clamping bulges are cooperatively in clamping connection with the second clamping grooves, so that the placing plate is fixed between the left frame and the right frame in a clamping connection manner.

Preferably, supporting legs for preventing the framework from shaking are arranged at four corners of the bottom of the framework respectively, the supporting legs are arranged at the bottom of the framework through set screws, a first screw hole and a second screw hole enabling the set screws to pass through are formed in the top of each supporting leg, the set screws pass through the corresponding first screw holes to be fixed and locked with one corner of the bottom of the lower frame respectively, and the set screws pass through the corresponding second screw holes to be fixed and locked with the front end or rear end of the bottom of the left frame or the right frame respectively, so that the supporting legs are fixedly arranged at the bottom of the framework.

Compared with the prior art, the disclosure has the following beneficial effects:

Firstly, the air-permeable storage cabinet is simple in structure, the left side and right side or the left side face and right side face of the bottom of the upper frame are provided with at least one first connector respectively, at least one first connecting hole corresponding to the first connector is formed in the tops or inner side faces of the left frame and the right frame respectively, the first connectors are fixedly in inserted connection with the corresponding first connecting holes respectively, the bottom face of the rear of the upper frame is provided with at least one second connector, at least one second connecting hole corresponding to the second connector is formed in the top of the rear frame, the second connector is fixedly in inserted connection with the second connecting hole, the left side and right side or the left side face and right side face of the top of the lower frame are provided with at least one third connector respectively, at least one third connecting hole corresponding to the third connector is formed in the bottoms or inner side faces of the left frame and the right frame respectively, the third connector is fixedly in inserted connection with the third connecting hole, the bottom face of the rear of the lower frame is provided with at least one fourth connector, at least one fourth connecting hole corresponding to the fourth connector is formed in the bottom of the rear frame, the fourth connector is fixedly in inserted connection with the fourth connecting hole, the rear side face of the right frame is provided with at least one fifth connector, at least one fifth connecting hole corresponding to the fifth connector is formed in the right side face of the rear frame, the rear side face of the left frame is provided with at least one sixth connector, at least one sixth connecting hole corresponding to the sixth connector is formed in the left side face of the rear frame, the fifth connector is fixedly in inserted connection with the fifth connecting hole, and the sixth connector is fixedly in inserted connection with the sixth connecting hole, so that the left frame and the right frame are fixedly in inserted connection to the left side and the right side of the rear frame respectively, detachable connection of the framework is realized, the framework can be disassembled for transportation or storage when the air-permeable storage cabinet is transported or does not need to be used, the occupied space during transportation or storage is effectively reduced, the transportation cost is greatly reduced, the framework is convenient to assemble, and the operation is simple.

Secondly, each of the upper frame, the lower frame, the left frame, the right frame, the front frame and the rear frame in the air-permeable storage cabinet comprises a frame body and a rhombus net, the periphery edge of each rhombus net is in inserted connection with the interior periphery of the corresponding frame body, a slot for being in inserted connection with each rhombus net is formed in the interior periphery of the corresponding frame body, the periphery edge of each rhombus net is in inserted connection with the corresponding slot in the interior periphery of the corresponding frame body, and is in fixed connection through extrusion of the frame bodies, a bending part, which bends towards the inner side or outer side of each frame body, integrally molded with each frame body, is arranged at the position of the corresponding slot, each bending part is in contact with the periphery edge of the corresponding rhombus net, through the arrangement of the rhombus nets, the ventilation and air permeability inside the framework are effectively guaranteed, goods stored inside the framework are prevented from mildewing and going bad, the contact area between each frame body and the corresponding rhombus net during extrusion is effectively increased through the arrangement of the bending part, the shearing force of the frame bodies during extrusion is prevented from cutting the rhombus nets, and the production quality of the product is effectively guaranteed.

Thirdly, a bending part which bends towards the inner side or outer side of each frame body and is in contact with the inner wall or outer wall of each frame body, integrally molded with each frame body, is arranged at the position of the corresponding slot, each bending part is in contact with the periphery edge of the corresponding rhombus net, each bending part is provided with a plurality of convex points in an equally-spaced manner, when a large framework is produced, in order to guarantee that the rhombus nets can be fixed in the frame bodies, the rhombus nets can be connected with the frame bodies more firmly through the solder resist convex points, and the rhombus nets are avoided from falling off.

Fourthly, the framework and the rhombus nets are made of metal materials respectively, the timber can be saved, the environment is protected, the rhombus nets are integrally formed by using punching stretching, the metal materials are saved, the cost is low, and the weight is light.

BRIEF DESCRIPTION OF THE DRAWINGS

In order to illustrate the technical scheme in the embodiment of the disclosure or in the prior art more clearly, the accompanying diagrams needing to be used in the embodiment or in the description in the prior art are simply described. Apparently, the embodiments in the following description are a part rather than all of the embodiments of the disclosure. For any person skilled in the art, under the premise of without contributing creative labor, other accompanying diagrams further can be obtained according to these accompanying diagrams.

DETAILED DESCRIPTION OF THE INVENTION

In order to make the purpose, technical scheme and advantages of the embodiment of the disclosure clearer, the technical schemes in the embodiments of the disclosure are clearly and completely described in the following with reference to the accompanying drawings in the disclosure. Apparently, the embodiments in the following description are merely a part rather than all of the embodiments of the disclosure. Based on the embodiment in the disclosure, all other embodiments obtained by the ordinary technical staff in the art under the premise of without contributing creative labor belong to the scope protected by the disclosure.

Embodiment I

Figure 1:
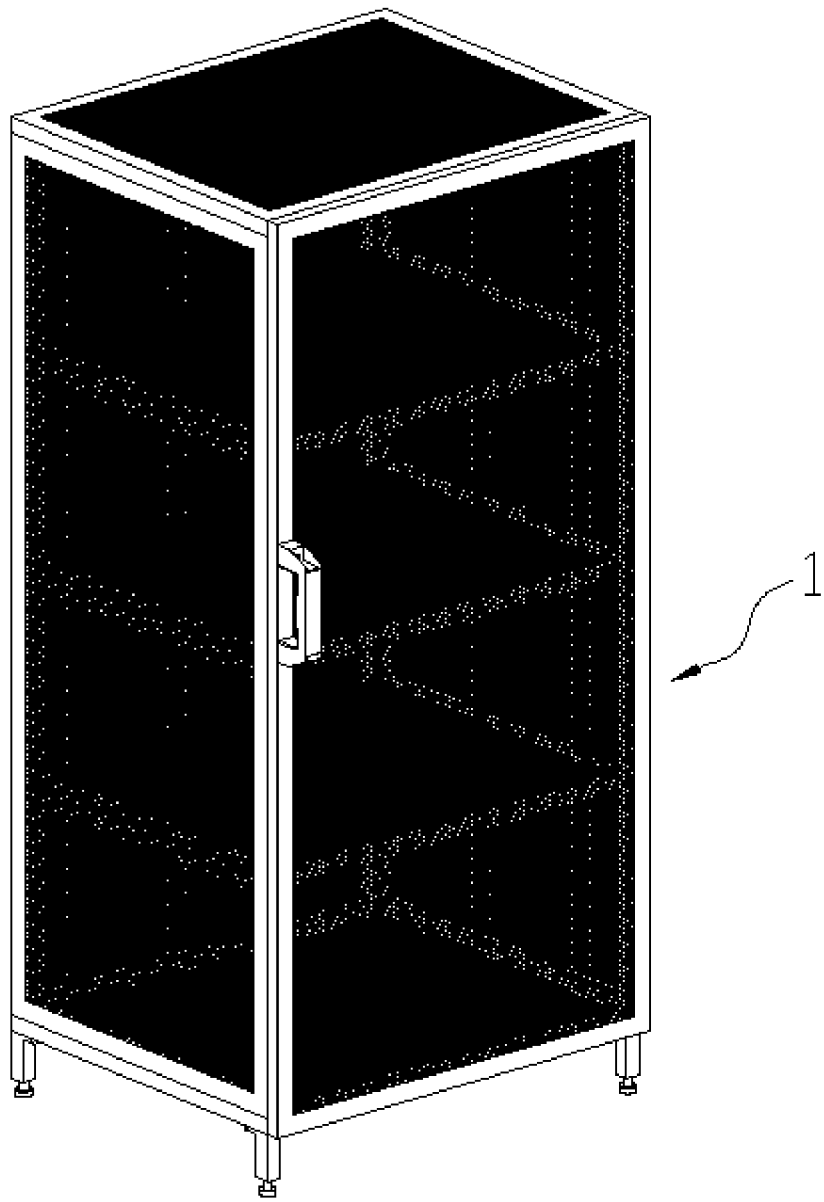
FIG. 1 is a schematic diagram of the integral structure of an air-permeable storage cabinet convenient to disassemble and assemble provided by the disclosure.
Figure 2:
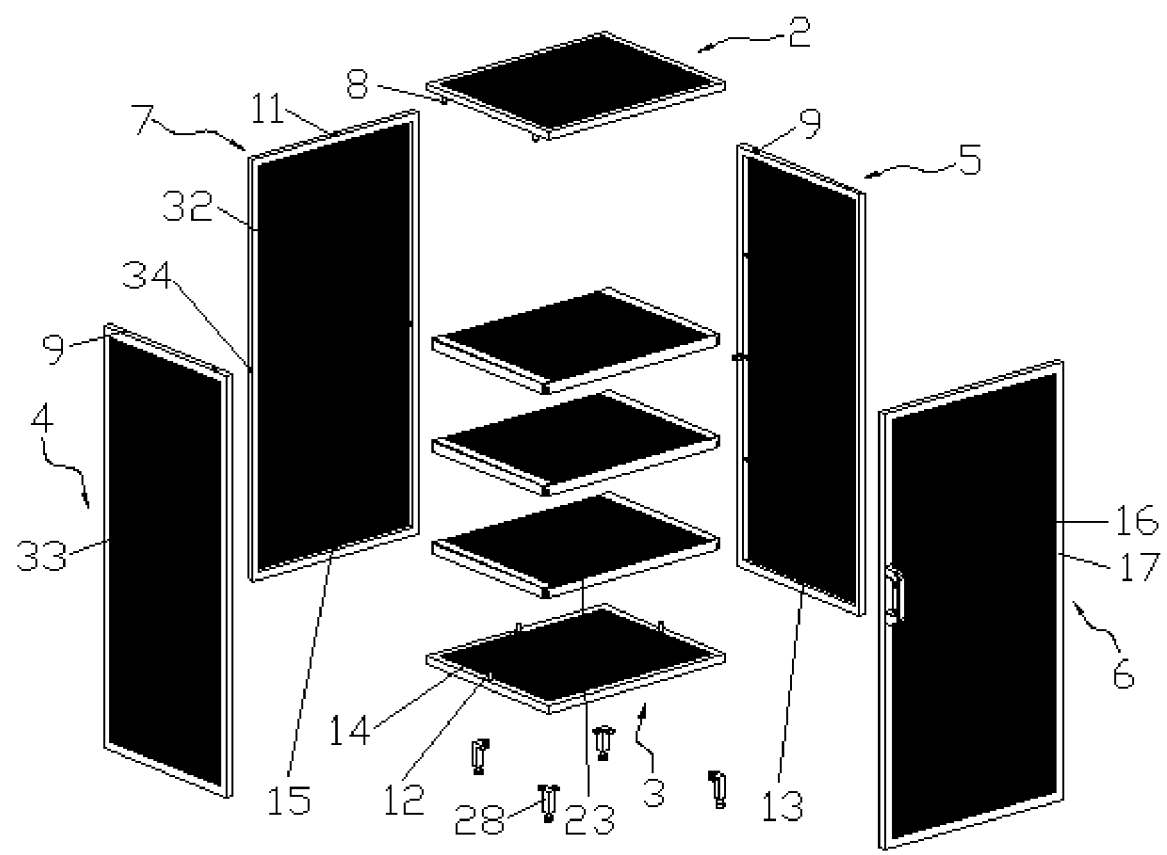
FIG. 2 is a schematic diagram of the breakdown structure of the air-permeable storage cabinet convenient to disassemble and assemble provided by the disclosure.
Figure 3:
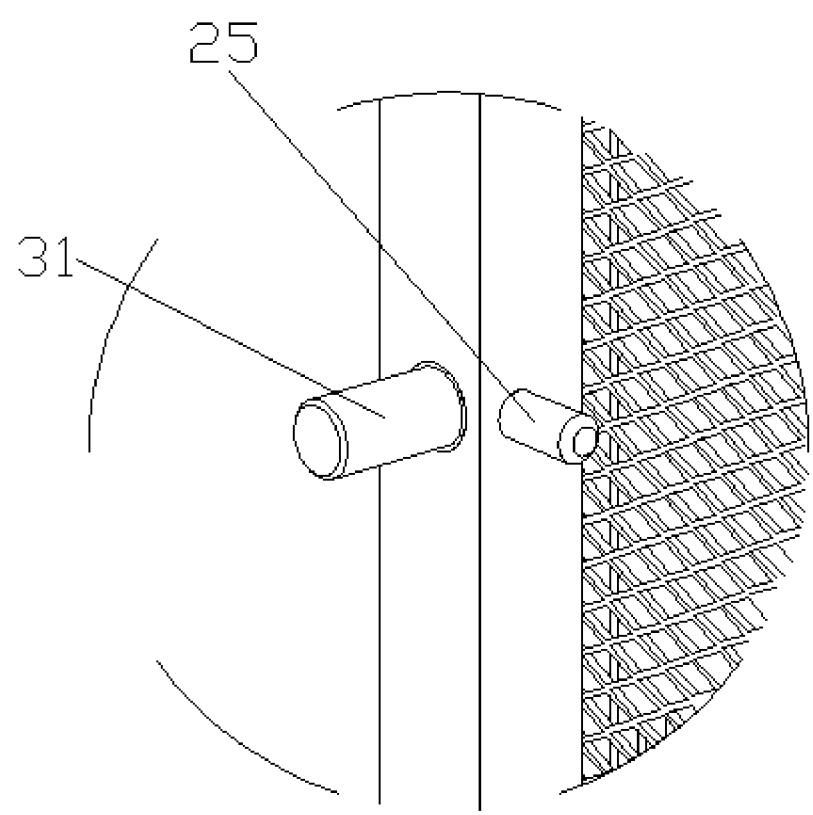
FIG. 3 is a schematic diagram of the first local structure of the air-permeable storage cabinet convenient to disassemble and assemble provided by the disclosure.
Figure 4:
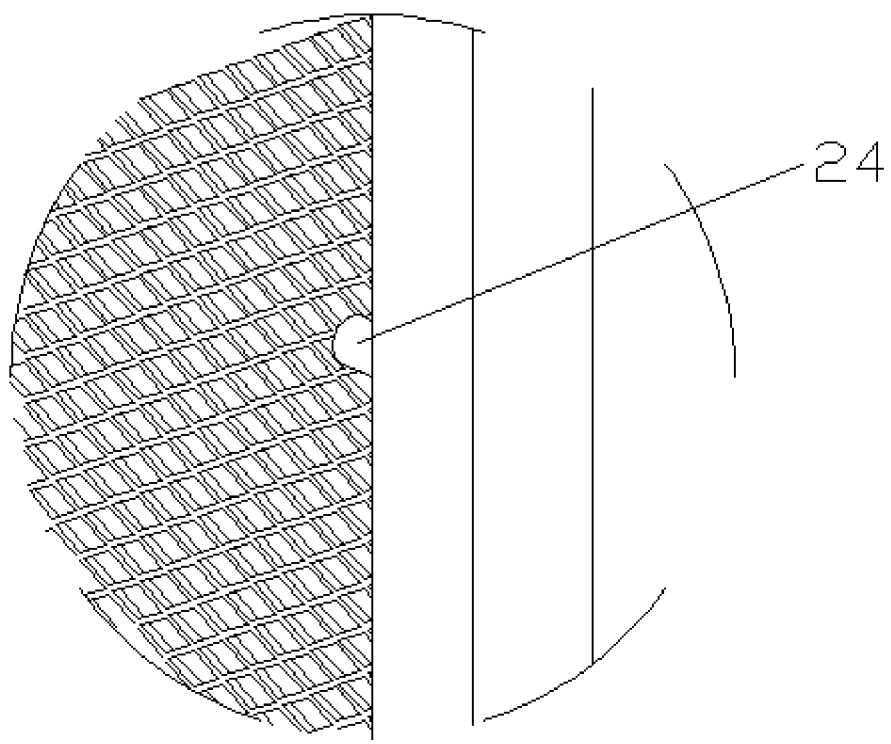
FIG. 4 is a schematic diagram of the second local structure of the air-permeable storage cabinet convenient to disassemble and assemble provided by the disclosure.

Refer to FIG. 1 to FIG. 2, the embodiment I of the disclosure provides an air-permeable storage cabinet convenient to disassemble and assemble comprising a framework 1, the framework 1 comprises an upper frame 2, a lower frame 3, a left frame 4, a right frame 5 and a rear frame 7, the left frame 4 is arranged on one side of the rear frame 7, and the right frame 5 is arranged on the other side of the rear frame 7, the upper frame 2 is arranged above the left frame 4 and the right frame 5, the lower frame 3 is arranged below the left frame 4 and the right frame 5, the left side and right side of the bottom of the upper frame 2 are provided with at least one first connector 8 respectively, at least one first connecting hole 9 corresponding to the first connector 8 is formed in the tops of the left frame 4 and the right frame 5 respectively, the first connectors 8 are fixedly in inserted connection with the corresponding first connecting holes 9 respectively, so that the left frame 4 and the right frame 5 are fixedly in inserted connection onto the left side and the right side of the upper frame 2 respectively, the bottom face of the rear of the upper frame 2 is provided with at least one second connector 10, at least one second connecting hole 11 corresponding to the second connector 10 is formed in the top of the rear frame 7, the second connector 10 is fixedly in inserted connection with the second connecting hole 11, so that the rear frame 7 is fixedly in inserted connection onto the rear side of the upper frame 2, the left side and right side of the top of the lower frame 3 are provided with at least one third connector 12 respectively, at least one third connecting hole 13 corresponding to the third connector 12 is formed in the bottoms of the left frame 4 and the right frame 5 respectively, the third connector 12 is fixedly in inserted connection with the third connecting hole 13, so that the left frame 4 and the right frame 5 are fixedly in inserted connection onto the left side and the right side of the lower frame 3 respectively, the bottom face of the rear of the lower frame 3 is provided with at least one fourth connector 14, at least one fourth connecting hole 15 corresponding to the fourth connector 14 is formed in the bottom of the rear frame 7, the fourth connector 14 is fixedly in inserted connection with the fourth connecting hole 15, so that the rear frame 7 is fixedly in inserted connection onto the rear side of the lower frame 3, the inner side face of the rear of the right frame 5 is provided with at least one fifth connector 31, at least one fifth connecting hole 32 corresponding to the fifth connector 31 is formed in the right side face of the rear frame 7, the inner side face of the rear of the left frame 4 is provided with at least one sixth connector 33, at least one sixth connecting hole 34 corresponding to the sixth connector 33 is formed in the left side face of the rear frame 7, the fifth connector 31 is fixedly in inserted connection with the fifth connecting hole 32, and the sixth connector 33 is fixedly in inserted connection with the sixth connecting hole 34, so that the left frame 4 and the right frame 5 are fixedly in inserted connection to the left side and the right side of the rear frame 7 respectively. The air-permeable storage cabinet further comprises a front frame 6, the front frame 6 is articulated with the left frame 4 or the right frame 5, and the embodiment is described in conjunction with the following accompanying diagrams.

In the embodiment, as shown in FIG. 2 to FIG. 6, the left side and right side of the bottom of the upper frame 2 are provided with at least one first connector 8 respectively, at least one first connecting hole 9 corresponding to the first connector 8 is formed in the tops of the left frame 4 and the right frame 5 respectively, the first connectors 8 are fixedly in inserted connection with the corresponding first connecting holes 9 respectively, so that the left frame 4 and the right frame 5 are fixedly in inserted connection onto the left side and the right side of the upper frame 2 respectively, the bottom face of the rear of the upper frame 2 is provided with at least one second connector 10, at least one second connecting hole 11 corresponding to the second connector 10 is formed in the top of the rear frame 7, the second connector 10 is fixedly in inserted connection with the second connecting hole 11, so that the rear frame 7 is fixedly in inserted connection onto the rear side of the upper frame 2, the left side and right side of the top of the lower frame 3 are provided with at least one third connector 12 respectively, at least one third connecting hole 13 corresponding to the third connector 12 is formed in the bottoms of the left frame 4 and the right frame 5 respectively, the third connector 12 is fixedly in inserted connection with the third connecting hole 13, so that the left frame 4 and the right frame 5 are fixedly in inserted connection onto the left side and the right side of the lower frame 3 respectively, the bottom face of the rear of the lower frame 3 is provided with at least one fourth connector 14, at least one fourth connecting hole 15 corresponding to the fourth connector 14 is formed in the bottom of the rear frame 7, the fourth connector 14 is fixedly in inserted connection with the fourth connecting hole 15, so that the rear frame 7 is fixedly in inserted connection onto the rear side of the lower frame 3, the inner side face of the rear of the right frame 5 is provided with at least one fifth connector 31, at least one fifth connecting hole 32 corresponding to the fifth connector 31 is formed in the right side face of the rear frame 7, the inner side face of the rear of the left frame 4 is provided with at least one sixth connector 33, at least one sixth connecting hole 34 corresponding to the sixth connector 33 is formed in the left side face of the rear frame 7, the fifth connector 31 is fixedly in inserted connection with the fifth connecting hole 32, and the sixth connector 33 is fixedly in inserted connection with the sixth connecting hole 34, so that the left frame 4 and the right frame 5 are fixedly in inserted connection to the left side and the right side of the rear frame 7 respectively, detachable connection of the framework 1 is realized, the framework 1 can be disassembled for transportation or storage when the air-permeable storage cabinet is transported or does not need to be used, the occupied space during transportation or storage is effectively reduced, the transportation cost is greatly reduced, the framework is convenient to assemble, and the operation is simple.

Figure 5:
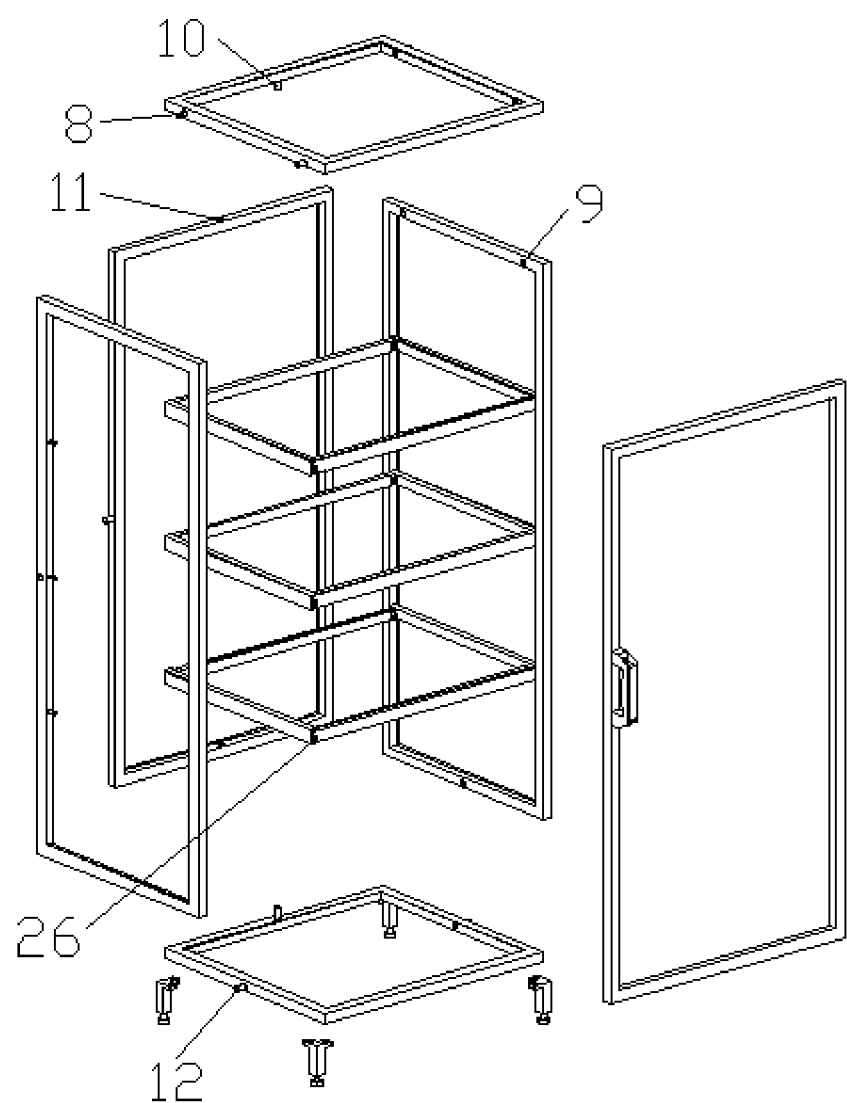
FIG. 5 is a schematic diagram of the structure of the air-permeable storage cabinet which is not provided with a rhombus net convenient to disassemble and assemble provided by the disclosure.
Figure 6:
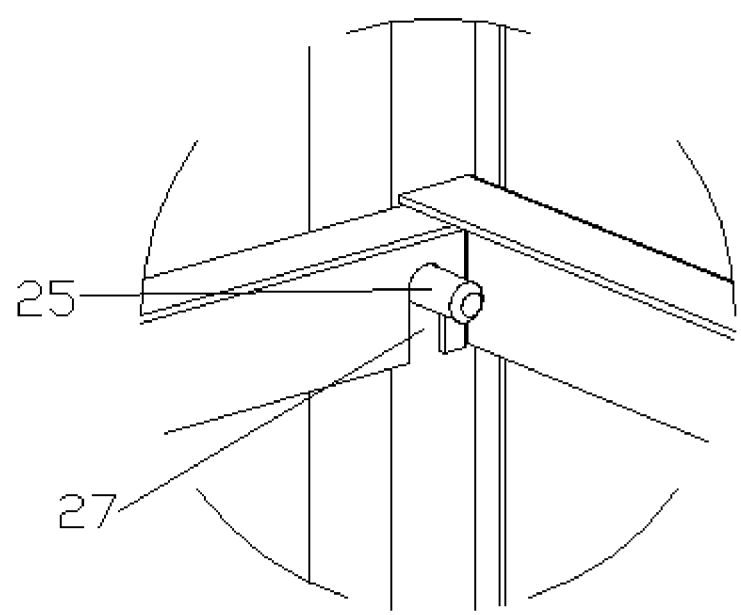
FIG. 6 is a schematic diagram of the third local structure of the air-permeable storage cabinet convenient to disassemble and assemble provided by the disclosure.
Figure 7:
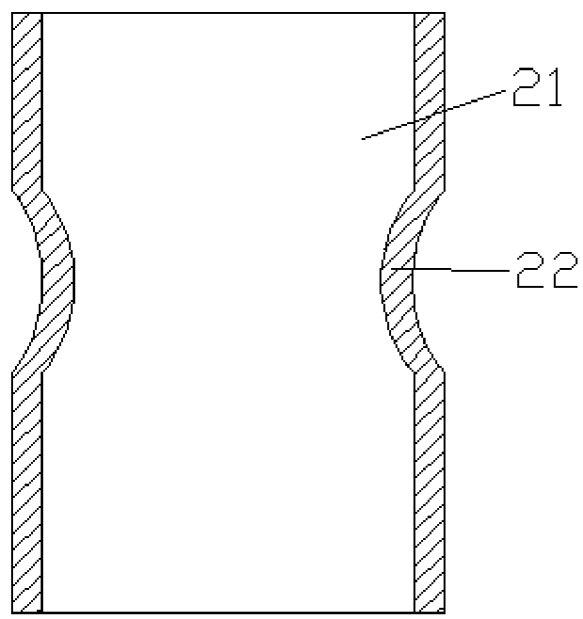
FIG. 7 is a section view of a connecting piece in the air-permeable storage cabinet convenient to disassemble and assemble provided by the disclosure.

As shown in FIG. 2, FIG. 5 and FIG. 7, connecting pieces 21 are arranged inside the first connecting hole 9, the second connecting hole 11, the third connecting hole 13, the fourth connecting hole 15, the fifth connecting hole 32 and the sixth connecting hole 34 respectively, the inner wall of each connecting piece 21 is inwards convexly provided with a convex ring 22, the first connector 8, the second connector 10, the third connector 12, the fourth connector 14, the fifth connector 31 and the sixth connector 33 are in inserted connection with the corresponding connecting pieces 21 respectively, and are in clamping connection with the convex rings 22 on the connecting pieces 21, interference fit is formed through clamping connection with the convex rings 22 on the connecting pieces 21, so that the framework 1 is effectively prevented from falling off or decomposing, and the service life of the framework 1 is effectively guaranteed.

Wherein, as shown in FIG. 2, the air-permeable storage cabinet further comprises a front frame 6, the front frame 6 is articulated with the left frame 4 or the right frame 5, and each of the upper frame 2, the lower frame 3, the left frame 4, the right frame 5, the front frame 6 and the rear frame 7 comprises a frame body 16 and a rhombus net 17, the periphery edge of each rhombus net 17 is fixedly connected with the periphery of the corresponding frame body 16 through welding respectively, through the arrangement of the rhombus nets 17, the ventilation and air permeability inside the framework 1 are effectively guaranteed, goods stored inside the framework 1 are prevented from mildewing and going bad, simultaneously, the timber does not need to be used, the application of the timber is saved, the environment is protected, the weight of the framework 1 is effectively reduced, and the rhombus nets 17 are connected with the frame bodies 16 through welding, so that stable and firm connection with the framework 1 is effectively guaranteed.

Moreover, as shown in FIG. 8 to FIG. 11, each rhombus net 17 and the corresponding frame body 16 also can be connected through inserted connection extrusion, the periphery edge of each rhombus net is in inserted connection with the interior periphery of the corresponding frame body 16, a slot 18 for being in inserted connection with each rhombus net 17 is formed in the interior periphery of the corresponding frame body 16, and the periphery edge of each rhombus net 17 is in inserted connection with the corresponding slot 18 in the interior periphery of the corresponding frame body 16, and is in fixed connection through extrusion of the frame bodies, and each rhombus net 17 is in inserted connection to the interior of the corresponding frame body 16, so that the attractive appearance of the product is improved, and welding is not needed.

Figure 10:
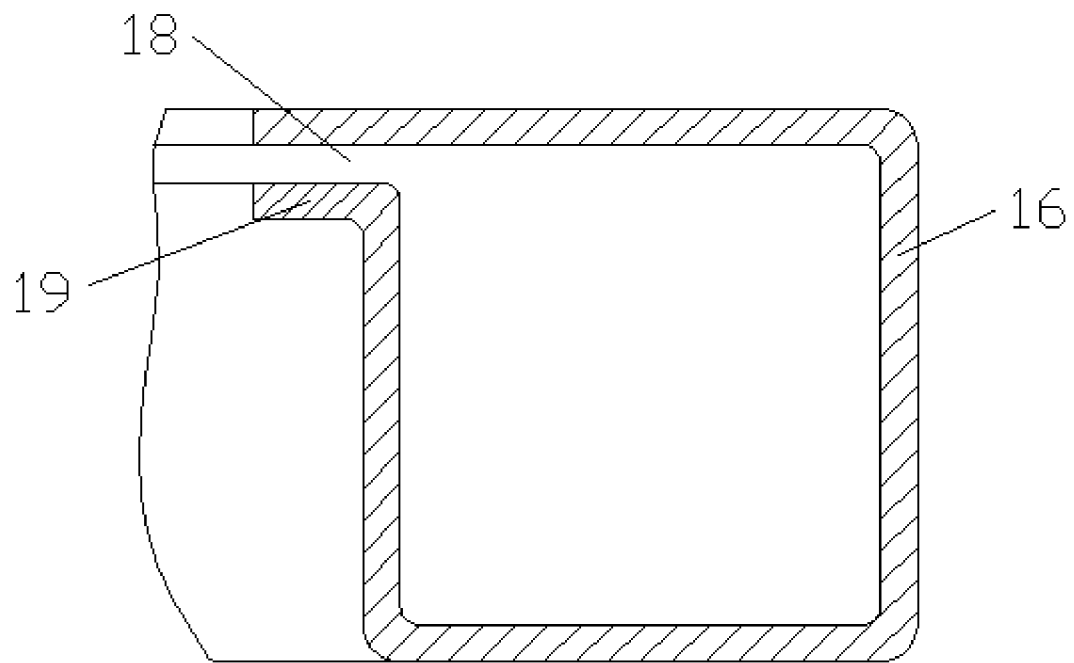
FIG. 10 is a third section view of the frame body in the air-permeable storage cabinet convenient to disassemble and assemble provided by the disclosure.
Figure 11:
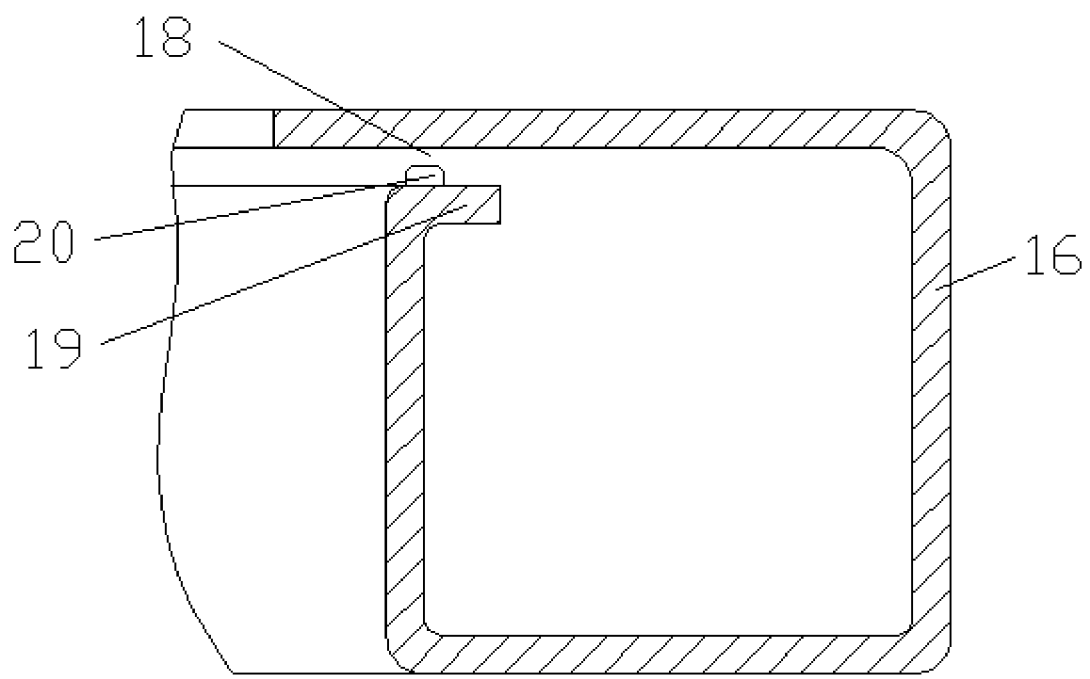
FIG. 11 is a fourth section view of the frame body in the air-permeable storage cabinet convenient to disassemble and assemble provided by the disclosure.

In the embodiment, as shown in FIG. 10 and FIG. 11, a bending part 19, which bends towards the inner side or outer side of each frame body 16, integrally molded with each frame body 16, is arranged at the position of the corresponding slot 18, each bending part 19 is in contact with the periphery edge of the corresponding rhombus net 17, the contact area between each frame body 16 and the corresponding rhombus net 17 during extrusion is effectively increased through the arrangement of the bending part 19, the shearing force of the frame bodies 16 during extrusion is prevented from cutting the rhombus nets 17, and the production quality of the product is effectively guaranteed.

Wherein, as shown in FIG. 11, a bending part 19, which bends towards the inner side of each frame body 16, integrally molded with each frame body 16, is arranged at the position of the corresponding slot 18, each bending part 19 is provided with a plurality of convex points 20 in an equally-spaced manner, when a large framework 1 is produced, in order to guarantee that the rhombus nets 17 can be fixed in the frame bodies 16, the rhombus nets 17 can be connected with the frame bodies 16 more firmly through the solder resist convex points 20, and the rhombus nets 17 are avoided from falling off.

Wherein, as shown in FIG. 2 to FIG. 6, at least one placing plate 23 is arranged inside the framework 1, the placing plate 23 is arranged between the left frame 4 and the right frame 5, at least one first clamping bulge 24 is arranged in the front of the interiors of the left frame 4 and the right frame 5, at least one second clamping bulge 25 which is matched with the first clamping bulge 24 and is arranged on the same horizontal line is arranged on the rear side faces of the interiors of the left frame 4 and the right frame 5, first clamping grooves 26 corresponding to the first clamping bulges 24 are formed in the left end and right end of the bottom of the front part of the placing plate 23 respectively, second clamping grooves 27 corresponding to the second clamping bulges 25 are formed in the left end and right end of the bottom of the rear side face of the placing plate 23 respectively, the first clamping bulges 24 are cooperatively in clamping connection with the first clamping grooves 26, and the second clamping bulges 25 are cooperatively in clamping connection with the second clamping grooves 27, so that the placing plate 23 is fixed between the left frame 4 and the right frame 5 in a clamping connection manner, the at least one placing plate 23 can be arranged inside the framework 1, and the dimensions of openings of the first clamping grooves 26 and the second clamping grooves 27 are smaller than the dimensions of the interiors of the first clamping grooves 26 and the second clamping grooves 27, so that the firmness of the placing plate 23 is strengthened, and the practicability of the storage cabinet is effectively increased.

Figure 12:
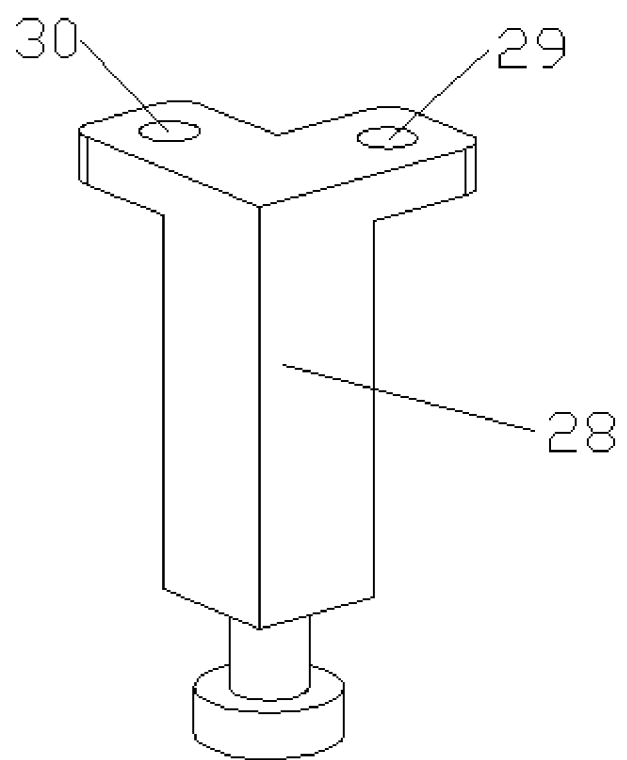
FIG. 12 is a schematic diagram of the structure of a supporting leg in the air-permeable storage cabinet convenient to disassemble and assemble provided by the disclosure.

Wherein, as shown in FIG. 12, supporting legs 28 for preventing the framework from shaking are arranged at four corners of the bottom of the framework 1 respectively, the supporting legs 28 are arranged at the bottom of the framework 1 through set screws, a first screw hole 29 and a second screw hole 30 enabling the set screws to pass through are formed in the top of each supporting leg 28, the set screws pass through the corresponding first screw holes 29 to be fixed and locked with one corner of the bottom of the lower frame 3 respectively, and the set screws pass through the corresponding second screw holes 30 to be fixed and locked with the front end or rear end of the bottom of the left frame 4 or the right frame 5 respectively, so that the supporting legs 28 are fixedly arranged at the bottom of the framework 1, the storage cabinet is effectively prevented from shaking in the using process, the firmness of connection among the left frame 4, the right frame 5 and the lower frame 3 is improved, and the supporting legs 28 are fixed supporting legs or castors.

Preferably, an electroplated layer or a paint layer or a flocking layer is arranged on the outer surface of each frame body 16 or the outer surface of each rhombus net, so that the service life of the storage cabinet is prolonged, and the attractive appearance of the storage cabinet is improved.

Wherein, the front frame 6 is articulated with the left frame 4 or the right frame 5, and can rotate relative to the left frame 4 or the right frame 5.

Embodiment II

Refer to FIG. 5, the embodiment II of the disclosure provides an air-permeable storage cabinet convenient to disassemble and assemble, comprising a framework 1, the framework 1 comprises an upper frame 2, a lower frame 3, a left frame 4, a right frame 5 and a rear frame 7, the left frame 4 is arranged on one side of the rear frame 7, and the right frame 5 is arranged on the other side of the rear frame 7, the air-permeable storage cabinet further comprises a front frame 6, the front frame 6 is articulated with the left frame 4 or the right frame 5, the differences from the embodiment I lie in that the upper frame 2 is arranged inside the left frame 4 and the right frame 5, the lower frame 3 is arranged inside the left frame 4 and the right frame 5, at least one first connector 8 is arranged on the left side face and right side face of the upper frame 2 respectively, at least one first connecting hole 9 corresponding to the first connector 8 is formed in the inner side faces of the left frame 4 and the right frame 5 respectively, the first connector 8 is fixedly in inserted connection with the corresponding first connecting hole 9 respectively, so that the left frame 4 and the right frame 5 are fixedly in inserted connection onto the left side and the right side of the upper frame 2 respectively, the left side face and right side face of the lower frame 3 are provided with at least one third connector 12 respectively, at least one third connecting hole 13 corresponding to the third connector 12 is formed in the inner side faces of the left frame 4 and the right frame 5 respectively, and the third connector 12 is fixedly in inserted connection with the third connecting hole 13, so that the left frame 4 and the right frame 5 are fixedly in inserted connection onto the left side and the right side of the lower frame 3 respectively, and unnecessary details of other same items are not given herein.

Figure 8:
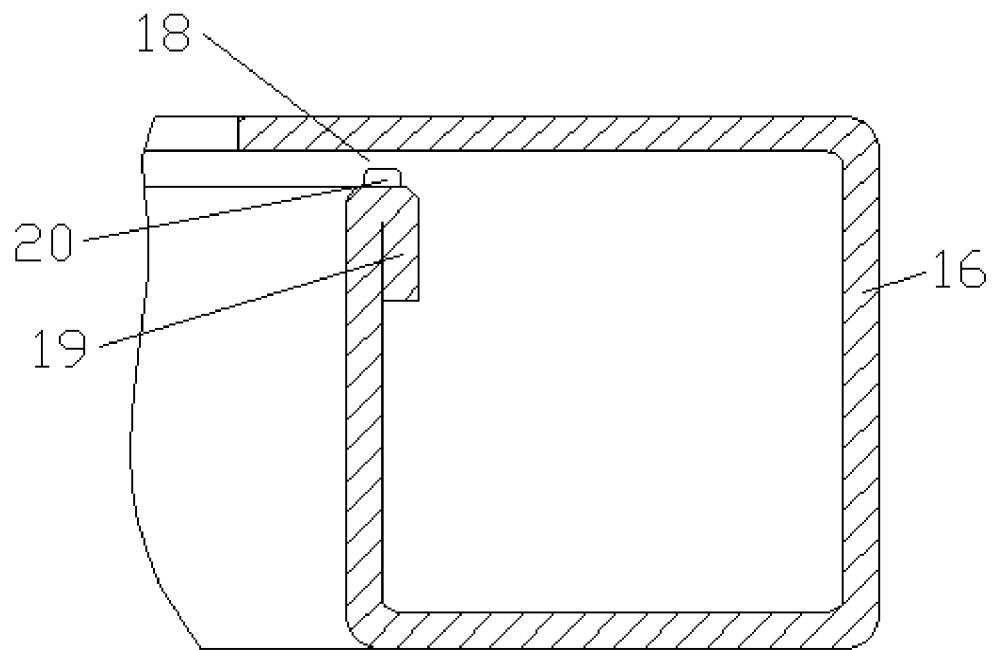
FIG. 8 is a first section view of a frame body in the air-permeable storage cabinet convenient to disassemble and assemble provided by the disclosure.
Figure 9:
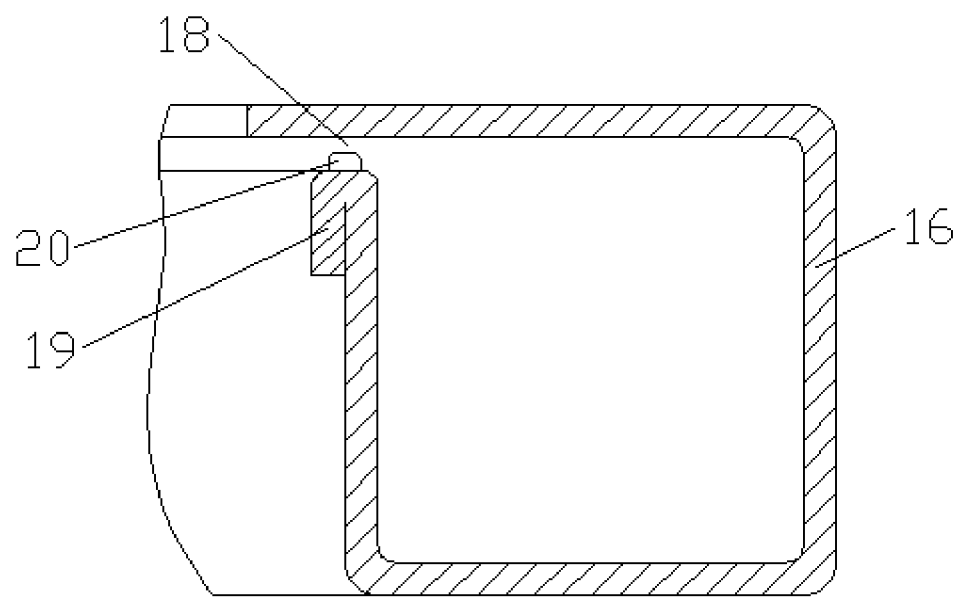
FIG. 9 is a second section view of the frame body in the air-permeable storage cabinet convenient to disassemble and assemble provided by the disclosure.

In the embodiment, as shown in FIG. 8 and FIG. 9, a bending part 19, which bends towards the inner side or outer side of each frame body 16 and is in contact with the inner wall or the outer wall of each frame body 16, integrally molded with each frame body 16, is arranged at the position of the corresponding slot 18, each bending part 19 is in contact with the periphery edge of the corresponding rhombus net 17, the contact area between each frame body 16 and the corresponding rhombus net 17 during extrusion is effectively increased through the arrangement of the bending part 19, the shearing force of the frame bodies 16 during extrusion is prevented from cutting the rhombus nets 17, and the production quality of the product is effectively guaranteed.

Preferably, each bending part 19 is provided with a plurality of convex points 20 in an equally-spaced manner, when a large framework 1 is produced, in order to guarantee that the rhombus nets 17 can be fixed in the frame bodies 16, the rhombus nets 17 can be connected with the frame bodies 16 more firmly through the solder resist convex points 20, and the rhombus nets 17 are avoided from falling off.

During assembling, the first connector 8, the second connector 10, the third connector 12, the fourth connector 14, the fifth connector 31 and the sixth connector 33 are in inserted connection with the corresponding first connecting hole 9, the corresponding second connecting hole 11, the corresponding third connecting hole 13, the corresponding fourth connecting hole 15, the corresponding fifth connecting hole 32 and the corresponding sixth connecting hole 34 respectively, so that the upper frame 2, the lower frame 3, the left frame 4, the right frame 5 and the rear frame 7 are fixed, the front frame 6 is connected with the right frame 5 through hinges, first clamping grooves 26 in the front of the placing plate 23 are in clamping connection with first clamping bulges 24, and second clamping grooves 27 on the rear side face of the placing plate 23 are in clamping connection with second clamping bulges 25, so that the placing plate 23 is fixedly in clamping connection between the left frame 4 and the right frame 5, set screws pass through corresponding first screw holes 29 on the supporting legs 18 to be locked and fixed with one corner of the right rear part of the bottom of the lower frame 3, the supporting legs 18 on the set screws pass through second screw holes 30 to be locked and fixed with one corner of the rear of the bottom of the right frame 5, so that the supporting legs 18 are fixedly arranged at four corners of the lower frame 3 and are fixedly arranged on the front ends and rear ends of the bottoms of the right frame 5 and the left frame 4 until complete assembling is completed.

Figure 13:
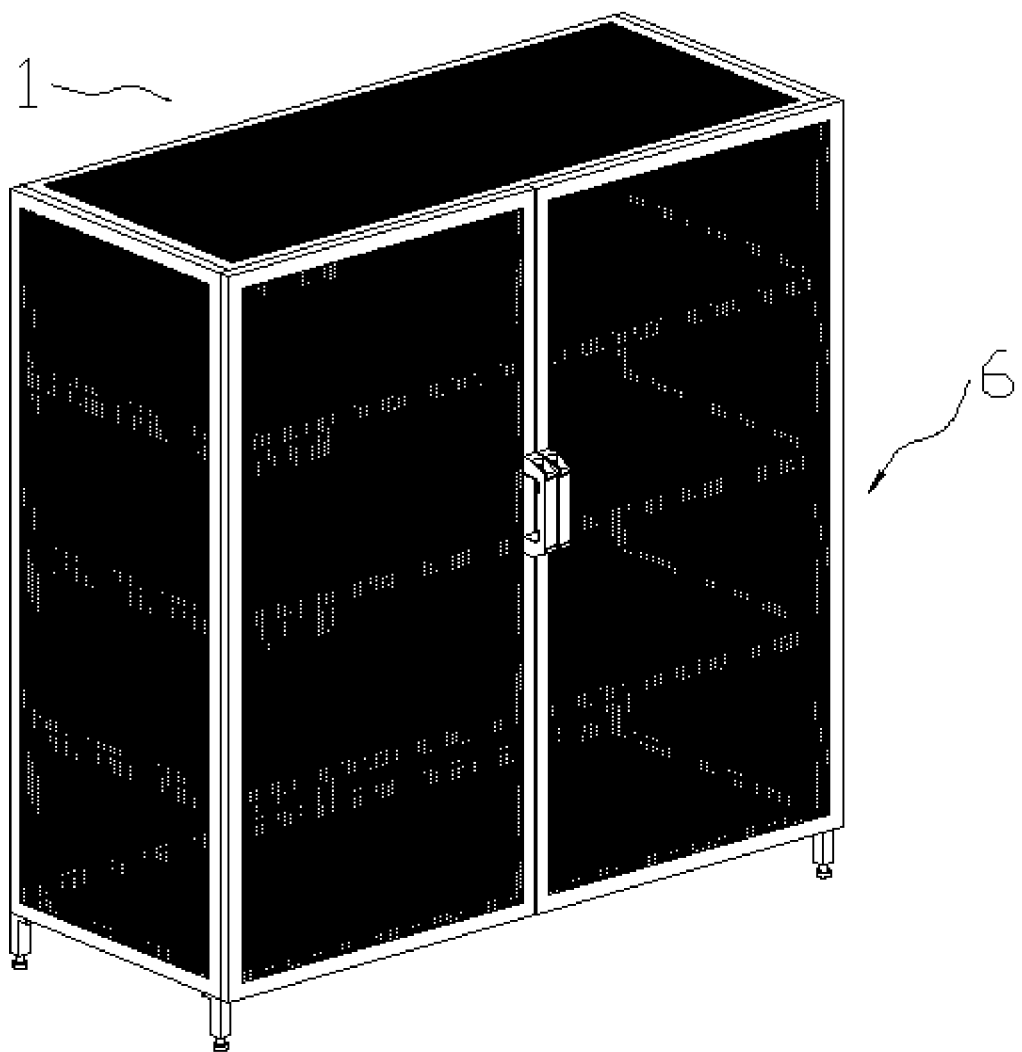
FIG. 13 is a schematic diagram of the other structure of the air-permeable storage cabinet convenient to disassemble and assemble provided by the disclosure.

In the two embodiments, the front frame 6 is of a single-door structure, and as shown in FIG. 13, the front frame 6 further can be of a double-door structure.

Figure 14:
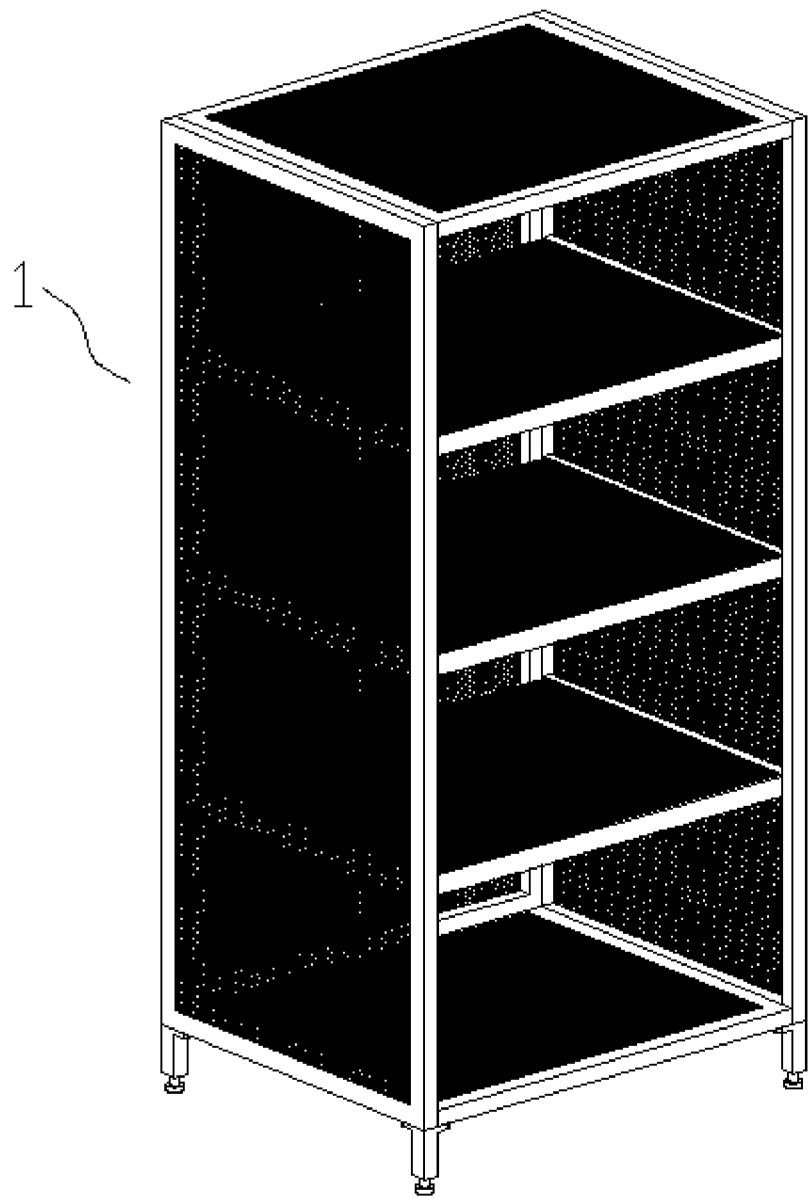
FIG. 14 is a schematic diagram of the structure of the air-permeable storage cabinet which is not provided with a front frame convenient to disassemble and assemble provided by the disclosure.

As shown in FIG. 14, the air-permeable storage cabinet convenient to disassemble and assemble provided by the disclosure further can be designed into a structure without the front frame 6, namely can become an open air-permeable storage cabinet convenient to disassemble and assemble without a door.

In conclusion, the air-permeable storage cabinet is simple in structure and convenient to assemble, detachable connection of the framework 1 is realized, the framework 1 can be disassembled for transportation or storage when the air-permeable storage cabinet is transported or does not need to be used, the occupied space during transportation or storage is effectively reduced, the weight is light, the transportation cost is greatly reduced, the framework is convenient to assemble, and the operation is simple.

The above embodiment is the preferable embodiment of the disclosure but not restrict the disclosure, and any other spirits without deviating from the disclosure and changes, modifications, replacements, combinations and simplifications made under principles all should be equivalent displacement manners, and are all included in the scope of the disclosure.

What is claimed is:
1. An air-permeable storage cabinet convenient to disassemble and assemble, comprising a framework (1), the framework (1) comprising an upper frame (2), a lower frame (3), a left frame (4), a right frame (5) and a rear frame (7), the left frame (4) being arranged on one side of the rear frame (7), and the right frame (5) being arranged on the other side of the rear frame (7), characterized in that the upper frame (2) is arranged above or inside the left frame (4) and the right frame (5), the lower frame (3) is arranged below or inside the left frame (4) and the right frame (5), a left side and a right side, or a left side face and a right side face, of the bottom of the upper frame (2) are provided with at least one first connector (8) respectively, at least one first connecting hole (9) corresponding to the first connector (8) is formed in top edges or inner side faces of the left frame (4) and the right frame (5) respectively, the first connectors (8) are fixedly in inserted connection with the corresponding first connecting holes (9) respectively, a bottom face of a rear edge of the upper frame (2) is provided with at least one second connector (10), at least one second connecting hole (11) corresponding to the second connector (10) is formed in a top edge of the rear frame (7), the second connector (10) is fixedly in inserted connection with the second connecting hole (11), a left side and a right side, or a left side face and a right side face, of a top surface of the lower frame (3) are provided with at least one third connector (12) respectively, at least one third connecting hole (13) corresponding to the third connector (12) is formed in bottom edges or the inner side faces of the left frame (4) and the right frame (5) respectively, the third connector (12) is fixedly in inserted connection with the third connecting hole (13), a rear side of the top surface of the lower frame (3) is provided with at least one fourth connector (14), at least one fourth connecting hole (15) corresponding to the fourth connector (14) is formed in a bottom edge of the rear frame (7), the fourth connector (14) is fixedly in inserted connection with the fourth connecting hole (15), the inner side face of a rear edge of the right frame (5) is provided with at least one fifth connector (31), at least one fifth connecting hole (32) corresponding to the fifth connector (31) is formed in a right side face of the rear frame (7), the inner side face of a rear edge of the left frame (4) is provided with at least one sixth connector (33), at least one sixth connecting hole (34) corresponding to the sixth connector (33) is formed in a left side face of the rear frame (7), the fifth connector (31) is fixedly in inserted connection with the fifth connecting hole (32), and the sixth connector (33) is fixedly in inserted connection with the sixth connecting hole (34): connecting pieces (21) are arranged inside the first connecting hole (9), the second connecting hole (11), the third connecting hole (13), the fourth connecting hole (15), the fifth connecting hole (32) and the sixth connecting hole (34) respectively, an inner wall of each connecting piece (21) is inwards convexly provided with a convex ring (22), the first connector (8), the second connector (10), the third connector (12), the fourth connector (14), the fifth connector (31) and the sixth connector (33) are in inserted connection with the corresponding connecting pieces (21) respectively, and are in clamping connection with the convex rings (22) on the connecting pieces (21).

2. The air-permeable storage cabinet convenient to disassemble and assemble according to claim 1, characterized by further comprising a front frame (6), the front frame (6) is articulated with the left frame (4) or the right frame (5), and each of the upper frame (2), the lower frame (3), the left frame (4), the right frame (5), the front frame (6) and the rear frame (7) comprises a frame body (16) and a rhombus net (17).

3. The air-permeable storage cabinet convenient to disassemble and assemble according to claim 2, characterized in that a periphery edge of each rhombus net (17) is fixedly connected with a periphery of the corresponding frame body (16) through welding respectively.

4. The air-permeable storage cabinet convenient to disassemble and assemble according to claim 2, characterized in that the periphery edge of each rhombus net (17) is in inserted connection with an interior periphery of the corresponding frame body (16), a slot (18) for being in inserted connection with each rhombus net (17) is formed in the interior periphery of the corresponding frame body (16), and the periphery edge of each rhombus net (17) is in inserted connection with the corresponding slot (18) in the interior periphery of the corresponding frame body (16), and is fixedly connected with the frame body (16) through extrusion.

5. The air-permeable storage cabinet convenient to disassemble and assemble according to claim 4, characterized in that a bending part (19), which bends towards an inner side or an outer side of each frame body (16), integrally molded with each frame body (16), is arranged at the position of the corresponding slot (18), and each bending part (19) is in contact with the periphery edge of the corresponding rhombus net (17).

6. The air-permeable storage cabinet convenient to disassemble and assemble according to claim 4, characterized in that a bending part (19) which bends towards an inner side or an outer side of each frame body (16) and is in contact with an inner wall or an outer wall of each frame body (16), integrally molded with each frame body (16), is arranged at the position of the corresponding slot (18), and each bending part (19) is in contact with the periphery edge of the corresponding rhombus net (17).

7. The air-permeable storage cabinet convenient to disassemble and assemble according to claim 6, characterized in that each bending part (19) is provided with a plurality of convex points (20) in an equally-spaced manner.

8. The air-permeable storage cabinet convenient to disassemble and assemble according to claim 4, characterized in that at least one placing plate (23) is arranged inside the framework (1), the placing plate (23) is arranged between the left frame (4) and the right frame (5), at least one first clamping bulge (24) is arranged in front side faces of the interiors of the left frame (4) and the right frame (5), at least one second clamping bulge (25) which is matched with the first clamping bulge (24) and is arranged on the same horizontal line is arranged on rear side faces of the interiors of the left frame (4) and the right frame (5), first clamping grooves (26) corresponding to the first clamping bulges (24) are formed in a left end and a right end of the bottom of a front part of the placing plate (23) respectively, second clamping grooves (27) corresponding to the second clamping bulges (25) are formed in a left end and a right end of the bottom of a rear side face of the placing plate (23) respectively, the first clamping bulges (24) are cooperatively in clamping connection with the first clamping grooves (26), and the second clamping bulges (25) are cooperatively in clamping connection with the second clamping grooves (27), so that the placing plate is fixed between the left frame (4) and the right frame (5) in a damping connection manner.

9. The air-permeable storage cabinet convenient to disassemble and assemble according to claim 4, characterized in that supporting legs (28) for preventing the framework from shaking are arranged at four corners of the bottom of the framework (1) respectively, the supporting legs (28) are arranged at the bottom of the framework (1) through at least two set screws, a first screw hole (29) and a second screw hole (30) enabling the set screws to pass through are formed in the top of each supporting leg (28), one of the set screws pass through the corresponding first screw holes (29) to be fixed and locked with one corner of the bottom of the lower frame (3) respectively, and another one the set screws pass through the corresponding second screw holes (30) to be fixed and locked with a front end or a rear end of the bottom of the left frame (4) or the right frame (5) respectively, so that the supporting legs (28) are fixedly arranged at the bottom of the framework (1).

\* \* \* \* \*